United States Patent [19]

Tao

[11] Patent Number: 4,947,097
[45] Date of Patent: Aug. 7, 1990

[54] AUTOMATIC SWITCHING OF MOTION CONTROL WITH TACTILE FEEDBACK

[75] Inventor: Douglas K. Tao, Nevada City, Calif.
[73] Assignee: The Grass Valley Group, Inc., Grass Valley, Calif.
[21] Appl. No.: 364,274
[22] Filed: Jun. 12, 1989
[51] Int. Cl.$^5$ ............................................. H02P 8/00
[52] U.S. Cl. .................................. 318/696; 318/685; 74/553; 307/116
[58] Field of Search ............... 318/696, 685, 480, 552; 74/553, 531; 307/116; 323/904; 116/2, 311, DIG. 29, DIG. 34

[56] References Cited

U.S. PATENT DOCUMENTS

| | | | |
|---|---|---|---|
| 4,012,966 | 3/1972 | Liebermann et al. | 74/553 |
| 4,037,490 | 7/1977 | Wilson | 73/553 |
| 4,050,265 | 9/1977 | Drennen et al. | 74/553 |
| 4,553,080 | 11/1985 | Cannon et al. | 318/696 |
| 4,652,805 | 3/1987 | Kohn | 318/696 |

Primary Examiner—William M. Shoop, Jr.
Assistant Examiner—Saul M. Bergmann
Attorney, Agent, or Firm—Francis I. Gray

[57] ABSTRACT

A rotary control knob is adapted to provide for automatic switching between two modes of movement control for a tape transport. An insulative ring surrounds a conductive knob, and the conductive knob is electrically connected to an oscillator circuit. Changes in the oscillator frequency due to operator contact with the conductive knob during movement of the knob are sensed to produce one mode of movement control, while movement of the knob due to operator contact with the insulative ring do not affect the oscillator frequency and indicate an alternative, default mode of movement control. A stepper motor is mechanically coupled to the control knob, and is electrically engaged in the default mode and disengaged in the one mode. In the default mode when the control knob reaches a predetermined control limit, a brake signal is generated that increases the current in the coils of the stepper motor, the increase in current resulting in increased resistance to movement of the control knob to provide tactile feedback to the operator.

4 Claims, 3 Drawing Sheets

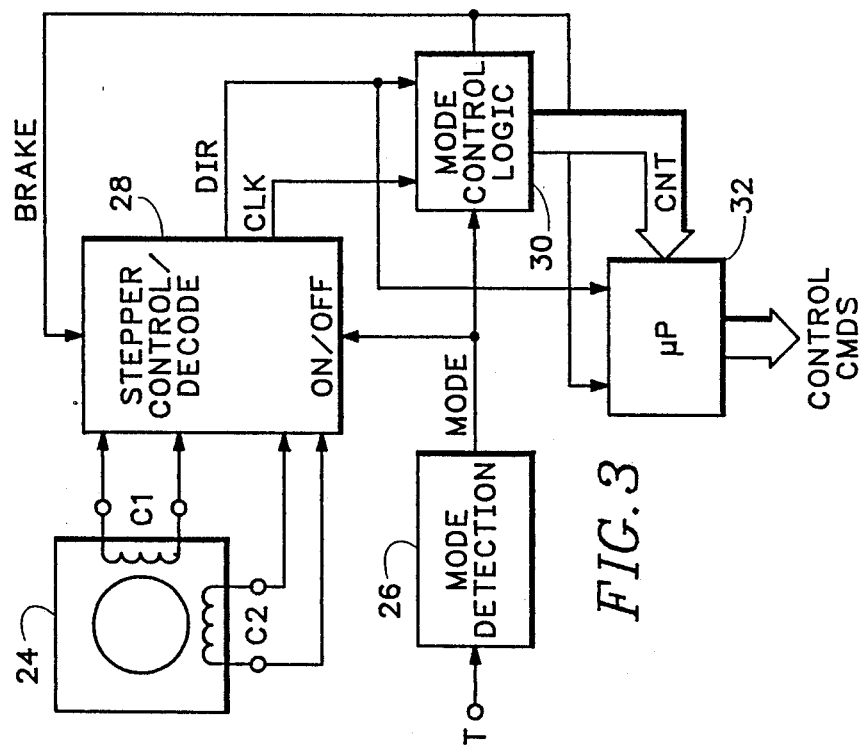
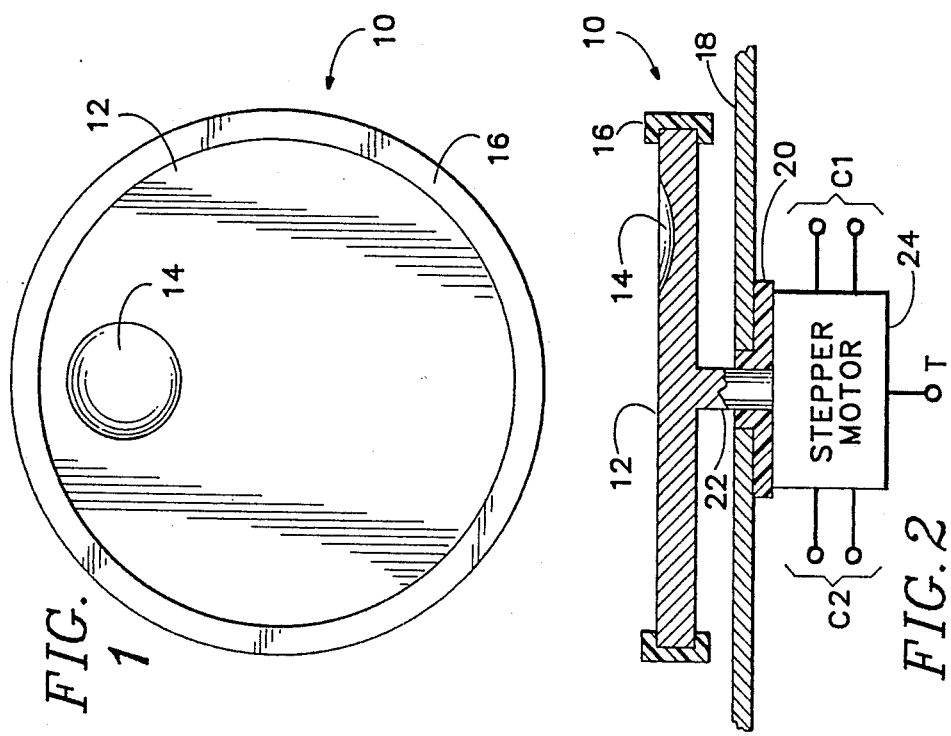

AUTOMATIC SWITCHING OF MOTION CONTROL WITH TACTILE FEEDBACK

BACKGROUND OF THE INVENTION

The present invention relates to switch control systems, and more particularly to an automatic switching of motion control with tactile feedback for the control of an audio or video tape recorder transport that uses touch sensitive technology to control modes of control and a stepper motor to provide tactile feedback.

The use of a control knob to control audio and video tape recorder transports has been in use for a long time in the bi-directional control of playback. The method of control generally is switched between two modes: a shuttle mode that controls the linear tape playback speed in proportion to the angle of rotation of a control knob, and a "jog" mode that moves the tape a discrete distance for each degree of rotation. Current technology uses a discrete switch to change between these two modes of control, either in the form of a pushbutton separate from the knob or in the form of a push switch incorporated as part of the knob. The use of the discrete switch results in manual mode control, making the transition from one mode of control to the other non-intuitive to an operator.

The tape transport speed generally has a maximum limit, and to alert the operator when that maximum limit is approached elaborate methods have been developed to provide some form of tactile feedback. The operator expects to feel a control limit when the shuttle control has been turned to its maximum, but expects continuous rotation to allow proper jog movement of the tape.

What is desired is a motion control mechanism for audio or video tape transports that automatically switches between jog and shuttle control modes in an intuitive manner for the operator while providing tactile feedback in the shuttle mode so the operator knows when the maximum transport speed is reached.

SUMMARY OF THE INVENTION

Accordingly the present invention provides an automatic switch for motion control that provides tactile feedback. A rotary knob is made of a conductive material with an insulated rim and is electrically isolated from a control panel on which it is mounted. A mode control circuit detects when an operator contacts the conductive portion of the knob to switch from one control mode to the other, automatically returning to the other control mode when the contact is broken. A stepper motor is mounted on the shaft of the knob to provide control signals for one mode while being electrically disconnected in the other mode. Using a counter in one mode, the counter being reset or enabled by a mode control signal from the mode control circuit, when the knob reaches a predetermined limit a brake signal is generated that is applied to the stepper motor to provide resistance to further turning of the knob, the resistance providing a tactile feedback to the operator.

The objects, advantages and other novel features of the present invention are apparent from the following detailed description when read in conjunction with the appended claims and attached drawing.

BRIEF DESCRIPTION OF THE DRAWING

FIG. 1 is a top plan view of a rotary knob for automatic switching of motion control according to the present invention.

FIG. 2 is a partial cross-sectional view of the rotary knob of FIG. 1.

FIG. 3 is a block diagram of the circuitry for generating an appropriate response to the operation of the rotary knob according to the present invention.

DESCRIPTION OF THE PREFERRED EMBODIMENT

Figure 4:
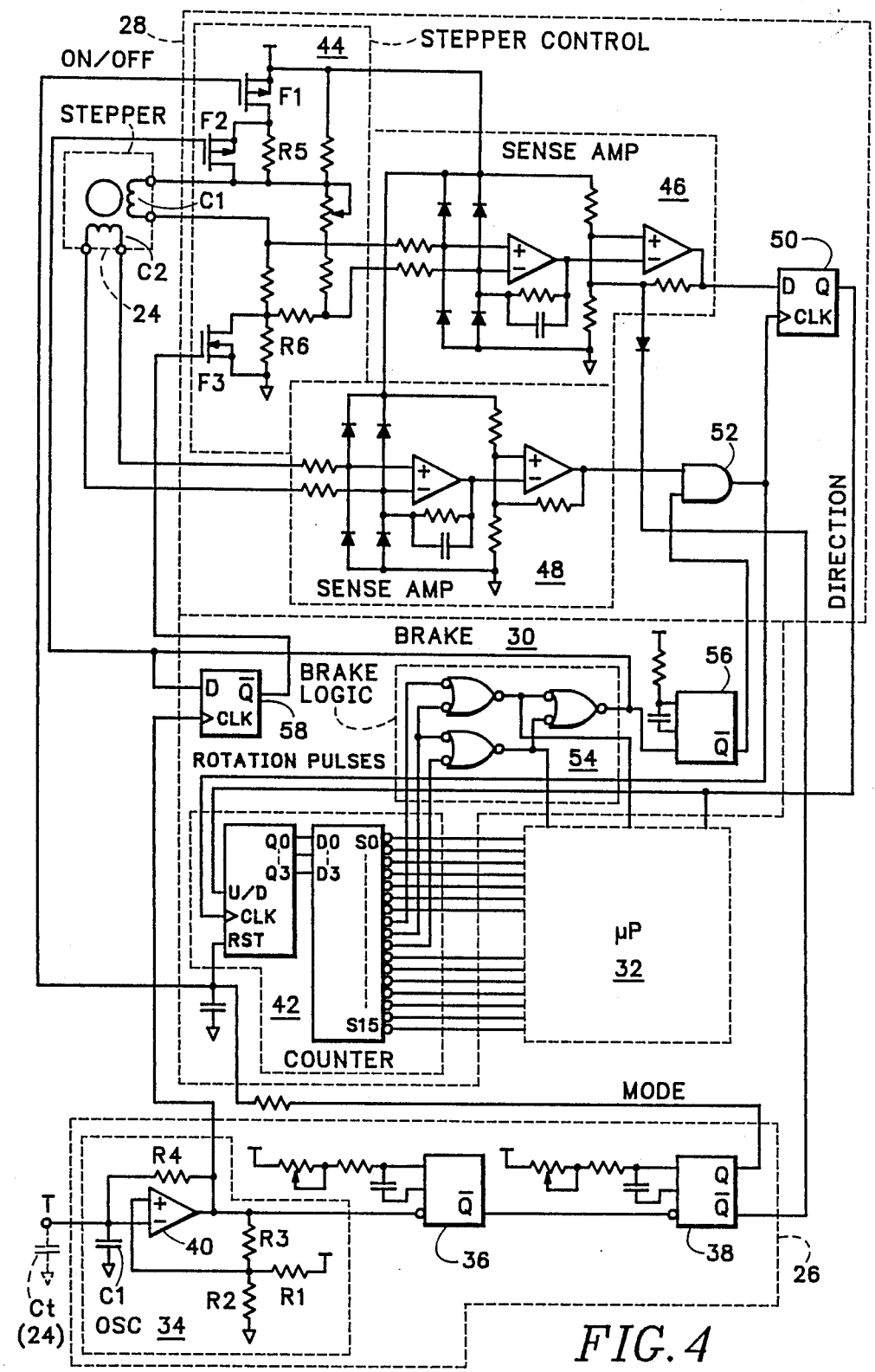
FIG. 4 is a schematic diagram of the circuitry of FIG. 3.

In normal operation the shuttle mode of a tape transport is controlled by an operator grabbing the outer ring of a control knob, while jogging is controlled by the operator using an index finger to spin the inner portion of the control knob. Referring now to FIGS. 1 and 2 the control knob 10 is shown in the form of a conductive rotary knob 12 having a finger indentation 14 and a circumferential insulating ring 16. The control knob 10 is mounted on a control panel or chassis 18, such as by an insulated bearing 20 about a shaft 22 of the rotary knob 12, so as to be electrically isolated from the chassis. A stepper motor 24 is mounted at the end of the shaft 22 within the chassis 18. An electrical output lead T is electrically connected to the rotary knob 12, while electrical leads C1, C2 are electrically connected to the two output coils of the stepper motor 24, the output coils being in phase quadrature with each other.

As shown in FIG. 3 the electrical output lead T provides an input to a mode detection circuit 26. The output of the mode detection circuit 26 is a mode control signal that indicates which of two modes, shuttle or jog, is selected according to whether the operator is contacting the rotary knob 12 or the insulating ring 16. The mode control signal together with the coil currents from terminals C1, C2 of the stepper motor 24 are input to a stepper control/decode circuit 28. The mode control signal acts as an ON/OFF signal to the stepper motor 24 by increasing or decreasing the current to the coils of the stepper motor according to the selected mode. The output of the stepper control/decode circuit 28 is a direction signal and a clock signal that reflects direction and angular movement of the control knob 10.

The mode control signal also is input to a mode control logic circuit 30 together with the direction and clock signals from the stepper control/decode circuit 28. The mode control logic circuit 30 outputs a brake signal when the control knob 10 is at its angular limit in either direction in the shuttle mode, the brake signal being applied to the stepper control/decode circuit 28 to provide resistance to further movement of the control knob. Also output from the mode control logic circuit 30 is a position signal in the form of a digital count representing the angular displacement of the control knob 10. The brake, position and direction signals are input to a control device 32, such as a microprocessor, to generate output commands that actually control the tape transport movement.

The mode detection circuit 26 is shown in greater detail in FIG. 4. There are three fundamental blocks that make up this circuit: an oscillator 34, a first retriggerable one-shot multivibrator 36 and a second retriggerable one-shot multivibrator 38. The oscillator 34 is a free running feedback oscillator that outputs a square wave having a nominal frequency, fo. An operational amplifier 40 has its non-inverting input coupled to a junction of a voltage divider network that adds two components: a constant bias component determined by resistors R1, R2 between two voltage rails and a portion of the oscillator output signal determined by resistors R3, R2 between the amplifier output and one of the voltage rails. The amplifier output is also coupled to the inverting input by a resistor R4. A capacitor C1 is connected between the inverting input and one of the voltage rails. An additional capacitance Ct is added in parallel to the capacitor C1 when an operator touches the conductive rotary knob 12 to lower the output frequency of the oscillator, $Fo = fo - ft$.

Figure 5A:
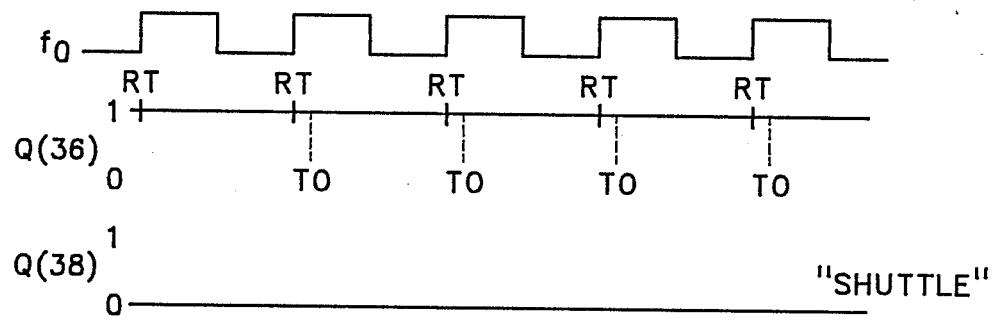
FIGS. 5a and 5b are timing diagrams illustrating the mode detection portion of the circuitry of FIG. 4.
Figure 5B:
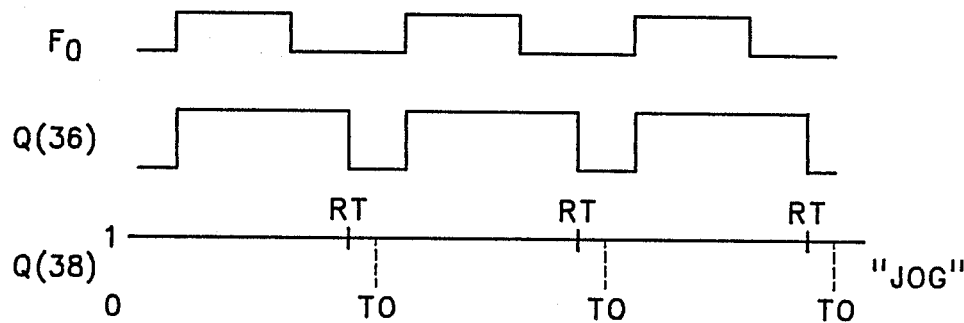

The output of the oscillator 34 is input to the first one-shot 36 that has its RC time constant of such a duration that when the frequency is "fo" it is retriggered at time RT before the RC time constant times out at time TO as shown in FIG. 5a. In this manner the output of the first one-shot is maintained at a constant level so long as the oscillator is at its nominal frequency. However when the oscillator changes frequency due to the contact of the rotary knob 12 by the operator inserting the capacitor Ct into the oscillator circuit, the RC time constant of the first one-shot 36 times out before it is retriggered by the oscillator signal. The output of the first one-shot changes state to present a pulse output. The output of the first one-shot 36 is input to the second one-shot 38 that has a longer RC time constant. The output of the second one-shot is at a first level so long as the first one-shot is maintained at a constant level. When the output of the first one-shot is the pulse signal, then the second one-shot switches to a second level and is retriggered at time RT to stay at the second level before the RC time constant for the second one-shot times out at time TO as shown in FIG. 5b so long as the pulse signal from the first one-shot is received. Thus the output of the second one-shot provides the mode control signal, either shuttle or jog, according to the output level, either low or high. The mode control signal from the second one-shot 38 serves to reset an up/down counter 42 in the mode control logic circuit 30 and to provide an on/off signal to the stepper control/decode circuit 28 to essentially disengage the stepper motor during the jog mode and engage the stepper motor during the shuttle mode.

Figure 6A:
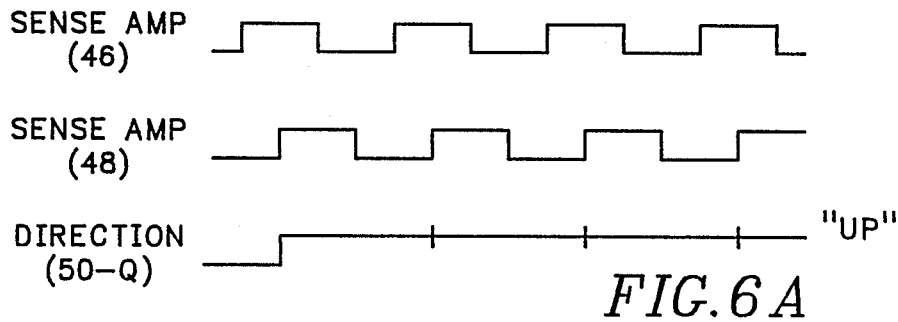
FIGS. 6a and 6b are timing diagrams illustrating the direction determination portion of the circuitry of FIG. 4.
Figure 6B:
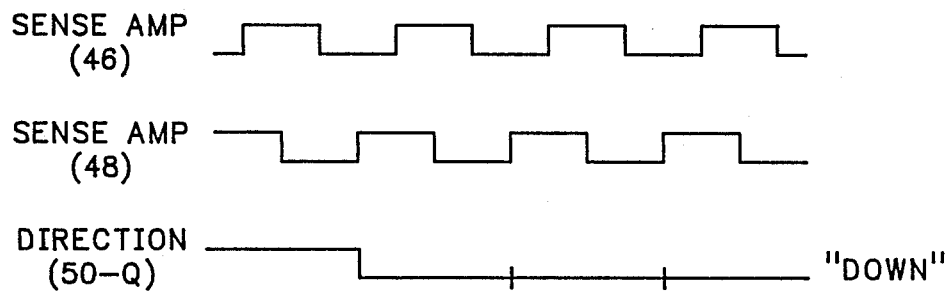

The stepper control/decode circuit 28 has a motor control circuit 44 coupled to the output C1 of one of the sense coils of the stepper motor 24. Also input to the motor control circuit 44 are the brake and mode control signals. The mode control signal is applied to the gate of transistor F1 to increase or decrease the current for the primary coil at C1. The brake signal is applied to the gates of opposite polarity transistors F2, F3, an antiphase brake signal being derived from a flip-flop 58 acting as an inverter, to short out parallel resistors R5, R6 and add additional current to the primary coil. The additional current provides sufficient emf to produce a significant resistance to movement of the control knob 10, providing tactile feedback to the operator that a predetermined control limit has been reached. In the absence of the brake signal as the stepper motor 24 is rotated, a counter emf is induced into the sensor coils C1, C2. The resulting currents are in quadrature due to the configuration of the sense coils. The currents from C1, C2 are input to respective sense amplifiers 46, 48 that produce a pair of square wave outputs that lead or lag each other by ninety degrees as the position of the control knob 10 is changed according to the direction of rotation. The number of cycles of the square wave determine the angular displacement of the control knob. The output of one sense amplifier 46 is input to the D-input of a D-type flip-flop 50, while the output of the other sense amplifier 48 is coupled to the clock input of the D-type flip-flop via an AND gate 52. The output of the D-type flip-flop 50 is a direction signal since, as shown in FIGS. 6a and 6b, if the output of one sense amplifier is leading the output of the other sense amplifier, i.e., is high when the output of the other sense amplifier triggers the flip-flop, the output signal from the flip-flop is at one level, and vice versa if the output of the one sense amplifier is lagging the output of the other sense amplifier.

The direction signal is input to the up/down counter 42 together with the pulse signal output from the AND gate 52. The up/down counter 42 counts the pulses of the pulse signal and outputs a count signal that represents the amount of angular rotation of the control knob 10. A portion of the count output from the up/down counter 42 is input to a brake logic circuit 54 to generate the brake signal when the count signal approaches its limits in either direction. The count signal, brake signal and direction signal are also input to the microprocessor 32 that generates the necessary control signals for the tape transport. The brake signal also is input to a brake one-shot 56 that inhibits the AND gate 52 so that no more pulses are passed to the counter 42 in the shuttle mode.

Thus the present invention provides a rotary control knob for automatically switching between two modes of operation in an intuitive manner by providing an insulative ring about a conductive control knob so that contact with the insulative ring produces one mode of operation while contact with the conductive portion of the control knob produces the other mode of operation, a tactile feedback loop to the operator being included so that when a predetermined control limit is reached in one mode of operation resistance to further movement of the control knob is encountered.

What is claimed is:
1. An apparatus for automatic switching between two modes of motion control comprising:
   a control knob having an insulative portion and a conductive portion;
   means for detecting when an operator contacts the control knob to generate a mode control signal having one of two states according to the portion of the control knob contacted; and
   means for controlling the motion of the apparatus as a function of the mode control signal and the movement of the control knob by the operator.

2. An apparatus as recited in claim 1 further comprising means for providing tactile feedback to the operator when the movement of the control knob in one of the modes reaches a predetermined control limit.

3. An apparatus as recited in claim 2 wherein the providing means comprises:
   a stepper motor mechanically coupled to the control knob, the stepper motor being electrically engaged when the mode control signal indicates the one mode;

means for determining when the movement of the control knob reaches the predetermined control limit to generate a brake signal; and means for increasing the resistance to movement of the stepper motor in response to the brake signal to provide the tactile feedback to the operator through the control knob.

4. An apparatus as recited in claim 1 wherein the detecting means comprises:

an oscillator having a fundamental frequency electrically coupled to the conductive portion of the control knob;

means for generating a contact signal when the fundamental frequency changes due to operator contact with the conductive portion; and means for generating the mode control signal as a function of the contact signal.

* * * * *